(12) United States Patent
Prokhorov

(10) Patent No.: US 9,493,157 B2
(45) Date of Patent: Nov. 15, 2016

(54) AUTONOMOUS VEHICLE OPERATION IN OBSTRUCTED OCCUPANT VIEW AND SENSOR DETECTION ENVIRONMENTS

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/609,286

(22) Filed: Jan. 29, 2015

(65) Prior Publication Data
US 2016/0221573 A1 Aug. 4, 2016

(51) Int. Cl.
*B60W 30/08* (2012.01)
(52) U.S. Cl.
CPC .................... *B60W 30/08* (2013.01)
(58) Field of Classification Search
CPC ...................................... B60W 30/08
USPC ............................................. 701/23
See application file for complete search history.

(56) References Cited

U.S. PATENT DOCUMENTS

| | | | |
|---|---|---|---|
| 8,589,014 B2 | 11/2013 | Fairfield et al. | |
| 9,080,866 B1 * | 7/2015 | Dowdall | G01S 17/023 |
| 2013/0245877 A1 * | 9/2013 | Ferguson | B60R 1/00 |
| | | | 701/23 |
| 2014/0214255 A1 | 7/2014 | Dolgov et al. | |
| 2014/0214259 A1 | 7/2014 | Trepagnier et al. | |
| 2015/0266489 A1 * | 9/2015 | Solyom | B60W 50/029 |
| | | | 701/23 |

FOREIGN PATENT DOCUMENTS

| | | | |
|---|---|---|---|
| JP | 2003344539 A | 12/2003 | |
| JP | 2010079565 A | 4/2010 | |

* cited by examiner

*Primary Examiner* — Behrang Badii
*Assistant Examiner* — Michael Berns
(74) *Attorney, Agent, or Firm* — Christopher G. Darrow; Darrow Mustafa PC

(57) ABSTRACT

Arrangements related to mitigating risk for autonomous vehicles in occupant view and vehicle sensor obstructed environments are presented. An information critical area in an external environment can be identified relative to a future planned driving maneuver of the autonomous vehicle. If at least a portion of the information critical area is outside of a determined occupant viewable area and a determined sensor detection area due to the presence of an obstructing object, it can be determined whether the obstructing object is moving favorably relative to the future planned driving maneuver. If the obstructing object is moving favorably relative to the future planned driving maneuver, the autonomous vehicle can be caused to implement the future planned driving maneuver while moving relative to the obstructing object so as to be shielded by the detected obstructing object from any potential objects located in the at least a portion of the information critical area.

20 Claims, 6 Drawing Sheets

AUTONOMOUS VEHICLE OPERATION IN OBSTRUCTED OCCUPANT VIEW AND SENSOR DETECTION ENVIRONMENTS

FIELD

The subject matter described herein relates in general to vehicles having an autonomous operational mode and, more particularly, to the operation of such vehicles in environments in which occupant views and sensor detection areas are obstructed.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. The computing systems are configured to process the detected information to determine how to navigate and/or maneuver the vehicle through the surrounding environment. In some instances, there may be portions of the surrounding environment which cannot be sensed by a human occupant or the vehicle sensors. Due to such blind spots, it may be unsafe for the vehicle to proceed in some instances.

SUMMARY

In one respect, the present disclosure is directed to method of operating an autonomous vehicle in occupant view and vehicle sensor obstructed environments. The method includes identifying an information critical area in an external environment relative to a future planned driving maneuver of the autonomous vehicle. The method also includes sensing at least a portion of the external environment of the autonomous vehicle to detect the presence of an obstructing object located therein. The method further includes, responsive to determining that at least a portion of the information critical area is located outside of a determined occupant viewable area and a determined sensor detection area due to the presence of the detected obstructing object, determining whether the detected obstructing object is moving favorably relative to a future planned driving maneuver of the autonomous vehicle. In addition, the method includes, responsive to determining that the detected obstructing object is moving favorably relative to the future planned driving maneuver of the autonomous vehicle, causing the autonomous vehicle to implement the future planned driving maneuver while moving relative to the detected obstructing object so as to be shielded by the detected obstructing object from any potential objects located in the at least a portion of the information critical area that is located outside of the determined occupant viewable area and the determined sensor detection area due to the detected obstructing object.

In another respect, the present disclosure is directed to a system for operating an autonomous vehicle in occupant view and vehicle sensor obstructed environments. The system includes a sensor system. The sensor system is configured to sense at least a portion of the external environment of the autonomous vehicle to detect the presence of an obstructing object located therein.

The system also includes a processor operatively connected to the sensor system. The processor is programmed to initiate executable operations. The executable operations include identifying an information critical area in an external environment relative to a future planned driving maneuver of the autonomous vehicle. The executable operations also include determining an occupant viewable area of the external environment. The executable operations further include determining a sensor detection area of the external environment.

The executable operations include, responsive to determining that at least a portion of the information critical area is located outside of the determined occupant viewable area and the determined sensor detection area due to the presence of the detected obstructing object, determining whether the detected obstructing object is moving favorably relative to a future planned driving maneuver of the autonomous vehicle. The executable operations include, responsive to determining that the detected obstructing object is moving favorably relative to a future planned driving maneuver of the autonomous vehicle, causing the autonomous vehicle to implement the future planned driving maneuver while moving relative to the detected obstructing object so as to be shielded by the detected obstructing object from any potential objects located in the at least a portion of the information critical area that is located outside of the determined occupant viewable area and the determined sensor detection area due to the detected obstructing object.

In yet another respect, the present disclosure is directed to a computer program product for operating an autonomous vehicle in occupant view and vehicle sensor obstructed environments. The computer program product includes a computer readable storage medium having program code embodied therein. The program code is executable by a processor to perform a method. The method includes identifying an information critical area in an external environment relative to a future planned driving maneuver of the autonomous vehicle. The method also includes sensing at least a portion of the external environment of the autonomous vehicle to detect the presence of an obstructing object located therein.

The method further includes determining an occupant viewable area of the external environment. Also, the method includes determining a sensor detection area of the external environment. The method includes, responsive to determining that at least a portion of the information critical area is located outside of the determined occupant viewable area and the determined sensor detection area due to the presence of the detected obstructing object, determining whether the detected obstructing object is moving favorably relative to a future planned driving maneuver of the autonomous vehicle. The method includes, responsive to determining that the detected obstructing object is moving favorably relative to a future planned driving maneuver of the autonomous vehicle, causing the autonomous vehicle to implement the future planned driving maneuver while moving relative to the detected obstructing object so as to be shielded by the detected obstructing object from any potential objects located in the at least a portion of the information critical area that is located outside of the determined occupant viewable area and the determined sensor detection area due to the detected obstructing object.

DETAILED DESCRIPTION

Figure 1:
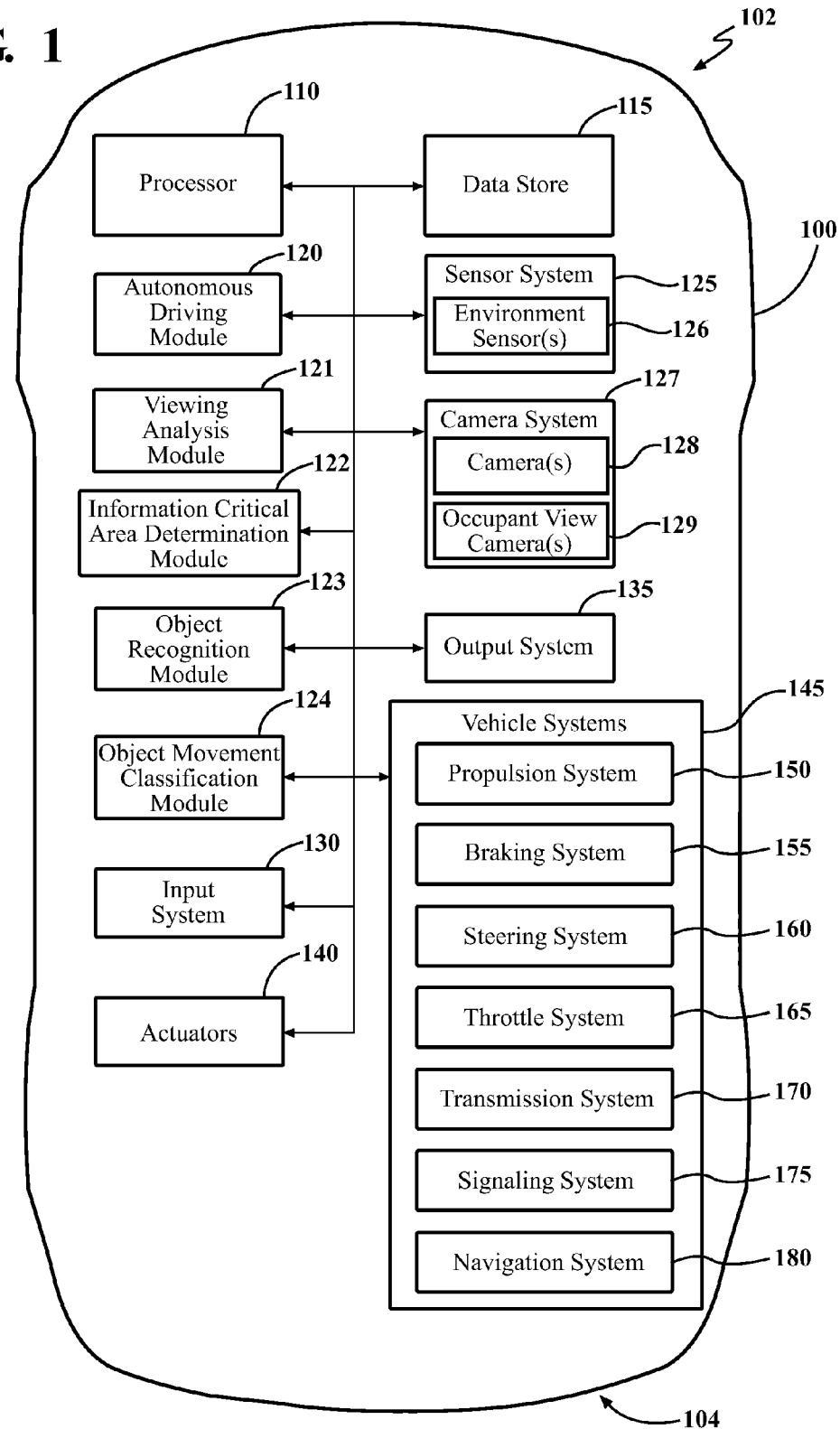
FIG. 1 is an example of an autonomous vehicle.

This detailed description relates to the operation of an autonomous vehicle in view-obstructed environments. More particularly, this detailed description relates to the operation of an autonomous vehicle when at least a portion of an information critical area in the environment is located outside of a determined occupant viewable area and a determined sensor detection area due to the presence of an obstructing object. In one or more implementations, it can be determined whether the detected obstructing object is moving favorably relative to the future planned driving maneuver of the autonomous vehicle. In response to determining that the detected obstructing object is moving favorably relative to the future planned driving maneuver of the autonomous vehicle, the autonomous vehicle can be caused to implement the future planned driving maneuver while moving relative to the detected obstructing object so as to be shielded by the detected obstructing object from any potential objects located in the information critical area. The present detailed description relates to systems, methods and computer program products that incorporate such features. In at least some instances, such systems, methods and computer program products can improve safety and/or occupant confidence in the autonomous operation of the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport. The vehicle 100 can have a front end 102 and a back end 104.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement one or more of the various processes described herein, including, for example, determining a current driving maneuvers for the vehicle 100, future driving maneuvers and/or modifications. The autonomous driving module 120 can also cause, directly or indirectly, such driving maneuvers or modifications thereto to be implemented. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain such instructions.

The vehicle 100 can include a viewing analysis module 121. The viewing analysis module 121 can be implemented as computer readable program code that, when executed by a processor, implement one or more of the various processes described herein. The viewing analysis module 121 can be a component of the processor 110, or the viewing analysis module 121 can be executed on and/or distributed among other processing systems to which the processor 110 is operatively connected.

The viewing analysis module 121 can be configured to detect, analyze, assess and/or interpret information about an external environment of the vehicle 100 to determine an occupant viewable area. "Occupant viewable area" means a portion of the external environment that is visible to a vehicle occupant. The determination of the occupant vehicle area can be based on one or more factors, including, for example, the location of an occupant within the vehicle 100, obstructions in the external environment (e.g. other vehicles, weather conditions, etc.), obstructions in the vehicle (e.g. portions of the vehicle frame or molding blocking the field of view, window tinting, etc.), seat position (e.g. height, location in a longitudinal direction of the vehicle, reclining position, etc.), human occupant physical measurements (e.g. height), human occupant physical limitations and/or human occupant sensory perception limitations, just to name a few possibilities. The human occupant physical measurement, human occupant physical limitations and/or human occupant sensory perception limitations can be based on data of a particular human being, an average human being, or other data set.

In one or more arrangements, the human occupant physical measurements can be based on actual measurements of one or more features of a human occupant. As an example, one or more images of at least a portion of the body of a human occupant can be captured. For instance, one or more images of at least a portion of the body of a human occupant can be captured by a scanner, camera and/or sensor. The viewing analysis module 121 or other element can include any suitable body recognition software and/or body analysis software. In one or more arrangements, at least a portion of the face of a human occupant can be captured. Facial recognition and/or analysis software can be used to facilitate image capture and/or to analyze captured images. Analyzing the images can include determining or measuring one or more physical features of a human occupant, such as eye size, pupillary distance, distance between the eyes, distance between at least one of the eyes and one or more other facial or body features, distance between at least one of the eyes and a structure within the vehicle, head angles, eye angles, the vertical meridian in each eye, the horizontal meridian in each eye, just to name a few possibilities.

In one or more arrangements, such measurements can be used, at least in part, to determine the occupant viewable area. In one or more arrangements, the occupant viewable area can also be determined by factoring in information/data about the field of vision of a human being. For instance, in one or more arrangements, a predetermined field of human vision can include a set of predetermined vision ranges, which can be based on a particular human being, an average human being, or other data set. As an example, one set of predetermined vision ranges can include: about 60 degrees nasally (e.g. toward the nose or inward) from the vertical meridian in each eye to about 100 degrees temporally (e.g. away from the nose or outward) from the vertical meridian in each eye, and about 60 degrees above and about 75 degrees below the horizontal meridian of each eye.

In one or more arrangements, the viewing analysis module 121 can be configured to determine or account for the actual vision ranges of a human occupant of the vehicle 100 when determining the occupant viewable area. For instance, the viewing analysis module 121 can be configured to obtain, access and/or receive information/data related to one or more aspects of the vision of a human occupant of the vehicle. For instance, the viewing analysis module 121 can be configured to conduct at least a partial visual field test of a human occupant of the vehicle 100. Alternatively or in addition, the viewing analysis module 121 can receive information/data or inputs corresponding to a human occupant's vision, including information/data concerning any medical conditions, corrective lenses, visual acuity, prior vision tests, etc.

The viewing analysis module 121 can be configured to determine the location of an object detected in the external environment relative to the occupant viewing area. More particularly, the viewing analysis module 121 can be configured to determine whether an object detected in the external environment is located outside of the occupant viewable area. Alternatively or in addition, the viewing analysis module 121 can be configured to determine whether at least a portion of an information critical area of the external environment is located outside of the determined occupant viewable area.

The viewing analysis module 121 can include instructions (e.g., program logic) executable by the processor 110. Such instructions can include instructions to determine an occupant viewing area, to determine the location of a detected object relative to the occupant viewing area and/or to determine whether at least a portion of an information critical area is located outside of the determined occupant viewable area. Alternatively or in addition, the data store 115 may contain such instructions.

The vehicle 100 can include an information critical area determination module 122. The information critical area determination module 122 can be implemented as computer readable program code that, when executed by a processor, implement the various processes described herein. The information critical area determination module 122 can be a component of the processor 110, or the information critical area determination module 122 can be executed on and/or distributed among other processing systems to which the processor 110 is operatively connected.

The information critical area determination module 122 can be configured to identify an information critical area along a travel route of the vehicle. "Information critical area" means any portion of an external environment of a vehicle that is in which information contained therein is critical with respect to performing a future driving maneuver. In this context, "critical" means information that is important in determining whether the vehicle can safely and successfully complete a future driving maneuver. The information critical area can change as there are changes in the location, position and/or direction of the vehicle 100. Also, depending on the external environment, there may be one information critical area or more than one information critical area for a given future driving maneuver.

The information critical area determination module 122 can be operatively connected to a sensor system 125, a camera system 127, a navigation system 180 and/or other element of the vehicle 100 to identify an information critical area. In one or more arrangements, the information critical area determination module 122 can be operatively connected to one or more one or more of the data stores 115, which can include mapping or other data. As the vehicle 100 travels along a travel route, future driving maneuvers that the vehicle 100 will perform along the travel route can be assessed relative to other portions of the external environment.

Various examples of information critical areas are described herein. For instance, if a vehicle is approaching an intersection and a right turn is planned onto another street, then one information critical area would be at least a portion of the other street that is located to the left of the intersection. One example of such an area is shown at 450 in FIG. 4A. The presence or absence of objects in such an area would be critical to the future driving maneuver (e.g. turning right onto the street). In one or more arrangements, the information critical area can be located within a predetermined area or distance. For instance, for the information critical area shown in FIG. 4A, the information critical area can extend from the intersection to a predetermined distance away from the intersection. In one or more arrangements, the predetermined distance can be about 50 feet or less, about 75 feet or less, about 100 feet or less, about 150 feet or less, about 200 feet or less, etc.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. The sensor system 125 can have an associated sensor detection area. "Sensor detection area" means a portion of an environment that is located within the range of one or more sensors of a sensor system. The sensor detection area of the sensor system 125 can be determined by, for example, the sensor system 125, the viewing analysis module 121 and/or other module or element.

In arrangements in which the sensor system 125 includes a plurality of sensors, the sensors can work independently from each other. Alternatively, two or more of the sensors can work in combination with each other. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more environment sensors 126. The environment sensors 126 can be configured to detect, determine, assess, monitor, measure, quantify and/or sense objects in at least a portion of the external environment of the vehicle 100 and/or information/data about such objects. The one or more environment sensors 126 can be provided in any suitable location of the vehicle. In one or more arrangements, one or more of the environment sensors 126 can be located toward the front end 102 of the vehicle 100. In one or more arrangements, one or more environment sensors 126 can be located on a left side of the front end 102 of the vehicle 100. Alternatively or in addition, one or more environment sensors 126 can be located on a right side of the front end 102 of the vehicle 100. Additionally or alternatively, one or more environment sensors 126 can be located in any suitable location at or near the back end 104 of the vehicle 100.

Various examples of the environment sensors 126 will be described herein. However, it will be understood that the embodiments are not limited to the particular sensors described.

In one or more arrangements, one or more of the environment sensors 126 can use at least in part radio signals (e.g. RADAR based sensors). The one or more radio-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object.

In one or more arrangements, one or more of the environment sensors 126 can use at least in part lasers. For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object.

In one or more arrangements, one or more of the environment sensors 126 can use at least in part ultrasound. Such sensors can include an ultrasound source configured to emit ultrasonic signals and a detector configured to detect reflections of the ultrasonic signal. The one or more ultrasound-based environment sensors 126 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object. Such detecting can be based on a characteristic (e.g. the intensity) of a reflected ultrasonic signal.

In some arrangements, the sensor system 125, the processor 110, and/or one or more of the modules 120, 121, 122 can be configured to detect, determine, assess, monitor, measure, quantify and/or sense, directly or indirectly, one or more aspects, characteristics and/or properties of a detected object. For example, the sensor system 125, the processor 110, and/or one or more of the modules 120, 121, 122 can be configured to detect, determine, assess, monitor, measure, quantify and/or sense, directly or indirectly, the size, relative size, length, width, height, a dimension, the material, a material property, the speed, the acceleration and/or the trajectory of a detected object.

Alternatively or in addition to any of the sensors described above, the sensor system 125 can include other types of sensors. The sensor system 125, the processor 110, and/or one or more of the modules 120, 121, 122 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include a camera system 127. In one or more arrangements, the camera system 127 can be a part of the sensor system 125. The camera system 127 can include a one or more cameras 128 and/or one or more occupant view cameras 129. "Camera" is defined as any device, component, and/or system that can capture visual data. "Visual data" includes video and/or image information/data. The visual data can be in any suitable form.

In one or more arrangements, one or more of the cameras 128 and/or one or more of the occupant view cameras 129 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras 128 and/or one or more of the occupant view cameras 129 can be configured with zoom in and/or zoom out capabilities.

In one or more arrangements, one or more of the cameras 128 and/or one or more of the occupant view cameras 129 can be externally facing. "Externally facing" means a camera that is oriented, positioned, configured, operable and/or arranged to capture visual data from at least a portion of the external environment of the vehicle 100. The one or more cameras 128 and/or the one or more occupant view cameras 129 can be located in any suitable portion of the vehicle 100. For instance, one or more of the cameras 128 and/or one or more of the occupant view cameras 129 can be located within the vehicle 100. One or more of the cameras 128 and/or one or more of the occupant view cameras 129 can be located on the exterior of the vehicle 100. One or more of the cameras 128 and/or one or more of the occupant view cameras 129 can be located on or exposed to the exterior of the vehicle 100.

The position of one or more of the cameras 128 and/or one or more of the occupant view cameras 129 can be fixed such that its view cameras 129 can be fixed such that its position does not change relative to the vehicle 100. One or more of the cameras 128 and/or one or more of the occupant view cameras 129 can be movable so that its position can change to allow visual data from different portions of the external environment of the vehicle 100 to be captured. The movement of the cameras 128 and/or the occupant view cameras 129 can be achieved in any suitable manner. For instance, the cameras 128 and/or the occupant view cameras 129 can be rotatable about one or more axes, pivotable, slidable and/or extendable, just to name a few possibilities. In one or more arrangements, the cameras 128 and/or the occupant view cameras 129 can have any suitable range of motion, including, for example, substantially spherical, substantially hemi-spherical, substantially circular and/or substantially linear. As used herein, the term "substantially" includes exactly the term it modifies and slight variations therefrom. Thus, for example, the term "substantially spherical" means exactly spherical and slight variations therefrom.

The one or more cameras 128, the occupant view cameras 129, the movement of the one or more cameras 128 and/or the movement of the one or more occupant view cameras 129 can be controlled by the camera system 127, the sensor system 125, the processor 110 and/or any one or more of the modules 120, 121, 122.

"Occupant view camera" means any camera that is configured, positioned, located, movable and/or oriented to capture, acquire and/or collect visual data of an external environment of a vehicle to determine or assess the portion or portions of the external environment that can actually be seen by a human occupant of the vehicle. The occupant viewable area can be determined by, for example, the viewing analysis module 121 and/or the processor 110. The one or more occupant view cameras 129 can be provided in any suitable location. For instance, the one or more occupant view cameras 129 can be located within the interior of the vehicle 100.

In one or more arrangements, one or more occupant view cameras 129 can be provided to capture, acquire and/or collect visual data so that an occupant viewable area for the driver of the vehicle 100 can be determined. Alternatively or in addition, one or more occupant view cameras 129 can be provided to capture, acquire and/or collect visual data so that an occupant viewable area for a non-driver passenger of the vehicle 100 can be determined.

The viewing analysis module 121 and/or the processor 110 can be configured to analyze visual data captured by the one or more occupant view cameras 129 to determine an occupant viewable area. The viewing analysis module 121 and/or the processor 110 can be configured to analyze information/data captured by the sensor system 125 with respect to detected objects in the external environment and to locate the detected objects relative to the occupant viewable area. The sensor system 125, the viewing analysis module 121 and/or the processor 110 can be configured to determine the sensor detection area. The viewing analysis module 121 and/or the processor 110 can be configured to assess or compare the occupant viewable area and the sensor detection area.

In one or more arrangements, the vehicle 100 can include an object recognition module 123. In one or more arrangements, the object recognition module 123 can include artificial or computational intelligence elements, e.g., neural network, fuzzy logic or other machine learning algorithms. In some arrangements, the sensor system 125, the processor 110, and/or the object recognition module 123 can be configured to detect, determine, assess, measure, quantify and/or sense, directly or indirectly, one or more dimensions of a detected object. For instance, based on data received from one or more sensors of the sensor system 125, a direct measurement of one or more dimensions of a detected object can be determined. Examples of dimensions that can be detected, determined, assessed, measured, quantified and/or sensed, directly or indirectly, include length, width and/or height.

In some arrangements, the sensor system 125, the processor 110, and/or the object recognition module 123 can be configured to detect, determine, assess, measure, quantify and/or sense, directly or indirectly, a relative size of at least a portion of a detected object. In this regard, a "large object" is any object that has one or more dimensions greater than a predetermined dimension or is otherwise presumed to be "large" based on one or more factors. A "non-large object" is any object that has one or more dimensions less than a predetermined dimension or is otherwise presumed to be non-large based on one or more factors.

The relative size of a detected object can be determined in any suitable manner. For instance, a detected dimension of the object (e.g. length, width and/or height) can be compared to a predetermined dimension. The predetermined dimension can have any suitable value. In one or more arrangements, if the detected dimension is greater than the predetermined dimension, the object can be determined, classified and/or considered to be a large object. Such a comparison, determination, classification and/or consideration can be made by, for example, the processor 110 and/or the object recognition module 123. If the detected dimension is less than or equal to the predetermined dimension, the object can be determined, classified or considered to be a non-large object.

In one or more arrangements, the predetermined dimension can be a predetermined length. In such arrangements, the relative size of a detected object can be determined with respect to the predetermined length. For example, the length of an object can be detected. The detected length of the object can be compared to a predetermined length. The predetermined length can be any suitable length. In one or more arrangements, the predetermined length can be substantially equal to or greater than the length of the vehicle 100. In one or more arrangements, such as in the case of smaller vehicles, the predetermined length can be a value that is greater than the length of the vehicle 100. In some arrangements, if the detected length is greater than the predetermined length, the object can be determined, classified and/or considered to be a large object. If the detected length is less than or equal to the predetermined length, the object can be determined, classified and/or considered to be a non-large object.

Alternatively or in addition, the relative size of the object can be determined based on one or more inputs. For instance, the sensor system 125 can be configured to detect, determine, assess, measure, quantify and/or sense, directly or indirectly, the number of wheels or tires on a side of an object. Based on the number of detected wheels or tires, the processor 110 and/or the object recognition module 123 can determine whether the object is a large object. For instance, if more than two wheels are detected on a side of a surrounding object, then it can be determined to be a large object (e.g. a truck).

Alternatively or in addition, the sensor system 125, the processor 110 and/or the object recognition module 123 can be configured to detect, determine, assess, measure, quantify and/or sense, directly or indirectly, the size of the wheels or tires of an object. As an example, the wheels or tires of the object can have an associated diameter and/or radius. The size of the wheels or tires can be determined by a direct measurement of a diameter or radius of a wheel or tire. In some arrangements, the detected diameter or radius of the tires or wheels can be compared to a predetermined diameter or radius. The predetermined diameter or radius can be any suitable value. In one or more arrangements, the predetermined diameter or radius can be substantially equal to the diameter or radius of the tires or wheels of the vehicle 100. In one or more arrangements, such as in the case of vehicles with smaller wheels or tires, the predetermined diameter or radius can be a value that is greater than the diameter or radius of the tires or wheels of the vehicle 100. If the detected diameter or radius is greater than the predetermined diameter or radius, the object can be determined to be a large or long object. If the detected diameter or radius is less than or equal to the predetermined diameter or radius, the object can be determined, classified and/or considered to be a non-large object. Such a comparison and/or determination can be made by, for example, the processor 110 and/or the object recognition module 123.

The object recognition module 123 can include and/or have access to an object image database (not shown). The objects image database can include one or more images of a plurality of different objects (e.g. vehicles). Arrangements will be described herein in connection with vehicle, but it will be understood that arrangements are not limited to vehicles. Indeed, the object image database can include one or more images of non-vehicular objects. The images may be of one or more portions of the exterior of at least a portion of a plurality of different vehicles. For instance, the images can be of at least a portion of a vehicle. The images can be provided in any suitable format. The vehicle image database can be located on-board the vehicle 100, such as in the data store 115, or it can be located in a source external to the vehicle 100 (e.g. in a cloud-based data store).

As an example, the object recognition module 123 can also include any suitable vehicle recognition software or other object recognition software. The vehicle recognition software can analyze an image captured by the camera system 126. The vehicle recognition software can query the vehicle image database for possible matches. For instance, images captured by the camera system 126 can be compared to images in the vehicle image database for possible matches. Alternatively or in addition, measurements or other aspects of an image captured by the camera system 126 and/or the sensor system 125 can be compared to measurements or other aspects of any images in the vehicle image database. The object recognition module 123 can identify the detected object as a particular type of vehicle if there is a match between the captured image and an image in the vehicle database.

"Match" or "matches" means that an image or other information collected by the sensor system and one or more of the images in the vehicle database are substantially identical. For instance, the an image or other information collected by the sensor system and one or more of the images in the vehicle database can match within a predetermined probability (e.g., at least about 85%, at least about 90%, at least about 95% or greater) or confidence level.

In one or more arrangements, the vehicle 100 can include an object movement classification module 124. The sensor system 125, the processor 110, and/or the object movement classification module 124 can be configured to determine, assess and/or classify the movement of an object with respect to an information critical area relative to a future planned driving maneuver. "Future planned driving maneuver" means any movement or action of the vehicle that is intended or planned to occur in order for the vehicle to proceed along a current travel route of the vehicle.

In one or more arrangements, the object movement classification module 124 can determine whether an object is moving favorably or unfavorably relative to a future planned driving maneuver of the vehicle 100. "Moving favorably" means that the object is moving in a direction and/or in such a way that it will be located between an information critical area and an autonomous vehicle while the autonomous vehicle is implementing a future planned driving maneuver. "Moving unfavorably" means that the object is moving in a direction and/or in such a way that it will not be located between an information critical area and an autonomous vehicle while the autonomous vehicle is implementing a future planned driving maneuver.

The vehicle 100 can include an input system 130. An "input system" is defined as any device, component, system, element or arrangement or groups thereof that enable information/data to be entered into a machine. The input system 160 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" is defined as any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and BLUETOOTH Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured for operating an autonomous vehicle in occupant view-obstructed environments. According to arrangements herein, the vehicle 100 (or one or more elements thereof) can be configured to determine an occupant viewable area of the external environment, a sensor detection area of the sensor system 125 and/or the camera system 127, and/or identify an information critical area along a current travel route of the vehicle 100 that is related to a future planned driving maneuver.

In one or more arrangements, an action can be taken in response to determining that one or more detected objects in the external environment are located outside of a determined occupant viewable area. For instance, the action can be presenting an alert within the vehicle 100. Alternatively or in addition, the action can be causing a current driving maneuver of the vehicle 100 to be modified. These and other examples of possible actions will be described in greater detail throughout this description. In one or more arrangements, the processor 110, the driving module 120, the viewing analysis module 121 and/or other element(s) can be configured to determine whether one or more detected objects in the external environment are located outside of a determined occupant viewable area.

In one or more arrangements, it can be determined whether at least a portion of an information critical area is located outside of a determined occupant viewable area as well as a determined sensor detection area due to the presence of the detected obstructing object. In one or more arrangements, responsive to such a determination, it can be determined whether a detected obstructing object is moving favorably relative to a future planned driving maneuver of the vehicle 100. These and/or other determinations can be made by, at least in part, the processor 110, the autonomous driving module 120, the viewing analysis module 121, the information critical area determination module 122, the object recognition module 123, the object movement classification module 124 and/or other element(s). In one or more arrangements, if it is determined that the detected obstructing object is moving favorably relative to the future planned driving maneuver of the vehicle 100, the vehicle 100 can be caused to implement the future planned driving maneuver while moving relative to the obstructing object so as to be shielded by the obstructing object from any potential objects located in the information critical area.

Figure 2:
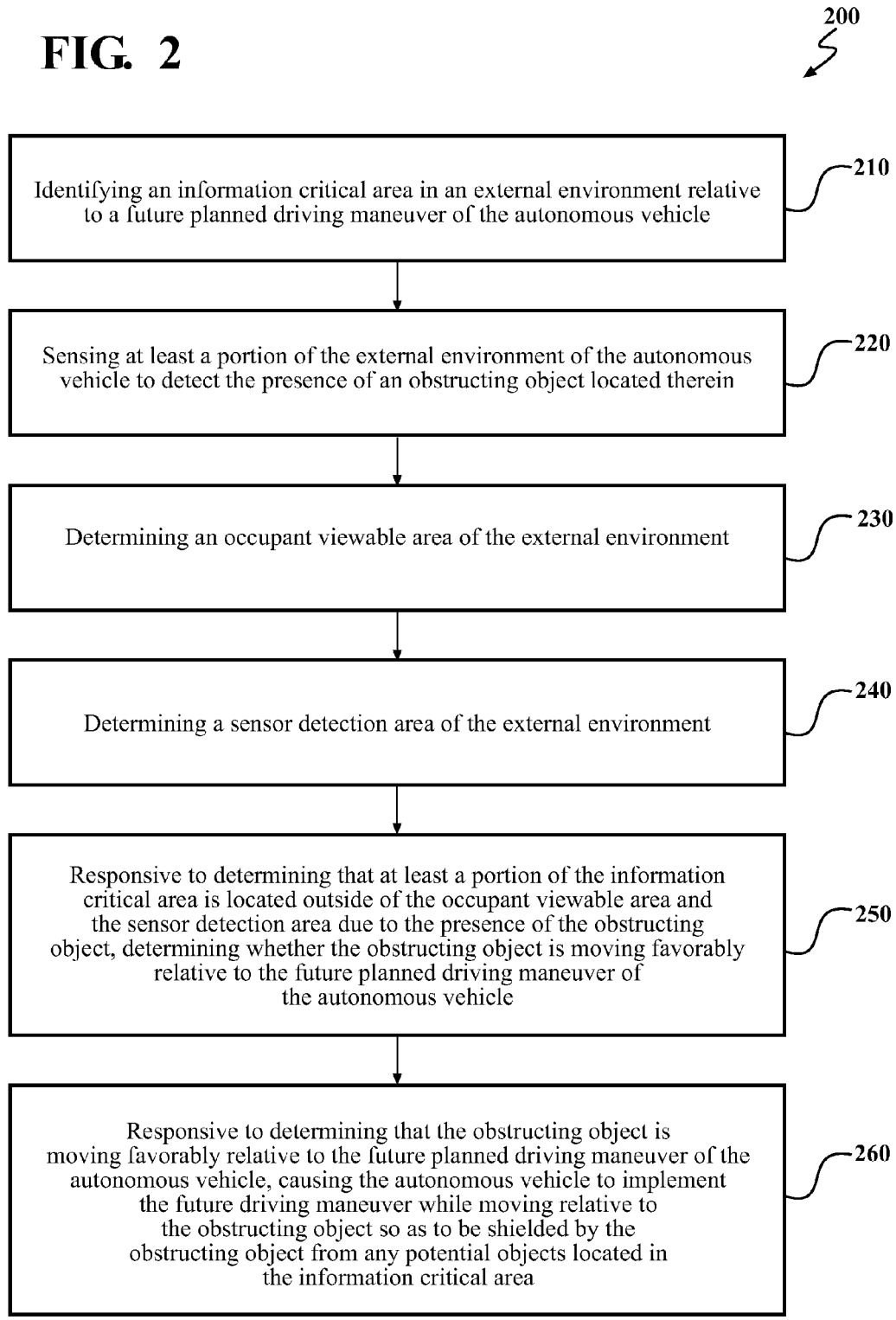
FIG. 2 is an example of a method of operating an autonomous vehicle in a view-obstructed environment.

Now that the various potential systems, devices, elements and/or components of the vehicle 100 have been described, various methods for operating an autonomous vehicle in a view-obstructed environment will now be described. Referring now to FIG. 2, an example of another method of operating an autonomous vehicle in view-obstructed portions of a travel route is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, an information critical area along at least a portion of the travel route can be identified. The information critical area can be related to a future driving maneuver of the vehicle 100. The identifying of the information critical area can be performed by any suitable element or combination of elements of the vehicle 100. In one or more arrangements, the identifying of the information critical area can be performed, at least in part, by the information critical area determination module 122, the navigation system 180 and/or the processor 110. In some arrangements, the identifying of the information critical area can be performed continuously or at any suitable interval. The method 200 can continue to block 220.

At block 220, at least a portion of an external environment of the autonomous vehicle can be sensed to detect the presence of objects located therein. More particularly, at least a portion of an external environment of the autonomous vehicle can be sensed to detect the presence of an obstructing object located therein. "Obstructing object" is any object that blocks a portion of the occupant viewable areas and/or the sensor detection area. The sensing of the external environment to detect the presence of one or more obstructing objects location therein can be performed by any suitable element or combination of elements of the vehicle 100. In one or more arrangements, the sensing of the external environment can be performed, at least in part, by the sensor system 125 (or component thereof), the camera system 127 (or portion thereof) and/or the processor 110. The method 200 can continue to block 230.

At block 230, an occupant viewable area of the external environment can be determined. The determining of the occupant viewable area can be performed by any suitable element or combination of elements of the vehicle 100. In one or more arrangements, the determining of the occupant viewable area can be performed by the sensor system 125, the camera system 127 (e.g. one or more occupant view cameras), the viewing analysis module 121 and/or the processor 110. The determining of the occupant viewable area can be performed continuously or at any suitable interval. The method 200 can continue to block 240.

At block 240, a sensor detection area of the vehicle can be determined relative to the external environment. The determining of the sensor detection area can be performed by any suitable element or combination of elements of the vehicle 100. In one or more arrangements, the determining of the sensor detection area can be performed by the sensor system 125, the camera system 127, the viewing analysis module 121 and/or the processor 110. The determining of the sensor detection area can be performed continuously or at any suitable interval. The method 200 can continue to block 250.

At block 250, it can be determined whether at least a portion of the information critical area is located outside of both the occupant viewable area and the sensor detection area due to the presence of the obstructing object. Such a determination can be performed by any suitable element or combination of elements of the vehicle 100. For instance, in one or more arrangements, the determining can be performed by the processor 110, the sensor system 125, the camera system 127, the viewing analysis module 121 and/or the information critical area determination module 122.

Responsive to determining that at least a portion of the information critical area is located outside of both the occupant viewable area and the sensor detection area due to the presence of the obstructing object, it can be determined whether the view obstructing-object is moving favorably relative to a future planned driving maneuver of the vehicle 100. Such a determination can be performed by any suitable element or combination of elements of the vehicle 100. For instance, in one or more arrangements, the determining can be performed by the processor 110, the sensor system 125, the camera system 127, the autonomous driving module 120 and/or the object movement classification module 124. The method can continue to block 260.

It can be determined whether the detected obstructing object is moving favorably or unfavorably relative to the future planned driving maneuver of the vehicle 100. Such a determination can be performed by any suitable element or combination of elements of the vehicle 100. For instance, in one or more arrangements, the determining can be performed by the processor 110, the sensor system 125, the camera system 127, the autonomous driving module 120 and/or the object movement classification module 124.

At block 260, responsive to determining that the detected obstructing object is moving favorably relative to the future planned driving maneuver of the vehicle, the future planned driving maneuver of the vehicle 100 can be caused to be implemented. The future planned driving maneuver can be implemented while moving relative to the obstructing object so as to be shielded by the obstructing object from any potential objects located in the information critical area, particularly the at least a portion of the information critical area that is located outside of both the occupant viewable area and the sensor detection area due to the detected obstructing object.

In one or more arrangements, the processor 110 and/or the driving module 120 can cause the vehicle 100 to implement the future planned driving maneuver. The processor 110 and/or the driving module 120 can be operatively connected to one or more of the vehicle systems 145 to cause the future planned driving maneuver to be implemented. In one or more arrangements, the processor 110 and/or the driving module 120 can be operable to control the one or more actuators 140, which can control one or more of the vehicle systems 145 or portions thereof to implement the future planned driving maneuver.

It should be noted that causing the future planned driving maneuver to be implemented can be performed automatically. In one or more arrangements, a vehicle occupant (e.g. a driver and/or other passenger) can be prompted to provide permission to implement the future planned driving maneuver. The vehicle occupant can be prompted in any suitable manner. For instance, a prompt can be presented on a display within the vehicle 100. Alternatively or in addition, the prompt can be audibly output to the vehicle occupant over one or more audial channels. Other forms of prompting can be used as an alternative or in addition to the above-described forms of prompting. Responsive to receiving an input corresponding to a vehicle occupant's approval to implement the future driving maneuver, the vehicle 100 can be caused to implement the future planned driving maneuver.

The future planned driving maneuver can be any type of driving maneuver. For instance, the future planned driving maneuver can be passing through an intersection, a right turn, a left turn, or even negotiating a roundabout. A current travel route can have a plurality of future planned driving maneuvers.

Further, moving relative to the obstructing object so as to be shielded by the obstructing object from any potential objects located in the information critical area can be any suitable movement of the vehicle 100. In one or more arrangements, moving relative to the detected obstructing object can include moving so as to keep the truck between the vehicle 100 and the information critical area 350. In some instances, moving relative to the detected obstructing object can include the vehicle 100 moving forward at substantially the same speed as the detected obstructing object. In some instances, moving relative to the detected obstructing object can include the vehicle 100 moving alongside the detected obstructing object without moving ahead of the detected obstructing object. In one or more arrangements a predetermined lateral spacing between the vehicle 100 and the detected obstructing object can be maintained. In one or more arrangements, a predetermined leading distance between the vehicle and the detected obstructing object can be maintained. "Leading distance" means the distance between a forward point of the detected obstructing object and a forward point of the vehicle. The forward points can be the forward-most points of the vehicle and/or the detected obstructing object. The forward points are determined with respect to the travel direction of the vehicle and the detected obstructing object.

In one or more arrangements, causing the autonomous vehicle to implement the future planned driving maneuver while moving relative to the detected obstructing object can be responsive to one or more additional factors. For instance, it can be determined whether the detected obstructing object is a large object. Such a determination can be made by, for example, the sensor system 125, the camera system 127, the processor 110 and/or the object recognition module 123. In one or more arrangements, causing the autonomous vehicle to implement the future planned driving maneuver while moving relative to the detected obstructing object can be further responsive to determining that the detected obstructing object is a large object. Thus, if a detected obstructing object is determined to be a large object, the autonomous vehicle can be caused to implement the future planned driving maneuver while moving relative to the detected obstructing object. However, if a detected obstructing object is determined to be a non-large object, the autonomous vehicle will not be caused to implement the future planned driving maneuver while moving relative to the detected obstructing object because a non-large object may be a poor candidate to serve as a shield for the vehicle 100 from any potential objects located in the information critical area.

When the vehicle is caused to implement the future planned driving maneuver, the method 200 can end. Alternatively, the method 200 can return to block 210. As a further alternative, the method 200 can include additional blocks (not shown). In some instances, the vehicle 100 can continue to move relative to the detected obstructing object at least until the vehicle 100 passes the information critical area and/or completes the future planned driving maneuver.

It should be noted that, in one or more implementations, responsive to determining that the detected obstructing object is moving unfavorably relative to the future planned driving maneuver of the vehicle, the future planned driving maneuver of the vehicle 100 may not be implemented or may not be implemented for a period of time and/or until a predetermined event occurs. As an example, responsive to determining that the detected obstructing object is moving unfavorably relative to the future planned driving maneuver of the vehicle 100, the implementation of the future planned driving can be delayed until the information critical area is located within at least one of the occupant viewable area and/or the sensor detection area. For instance, the vehicle 100 can wait to implement the future planned driving until the obstructing object has moved a sufficient distance such that information critical area becomes located within at least one of the occupant viewable area and/or the sensor detection area.

Figure 3A:
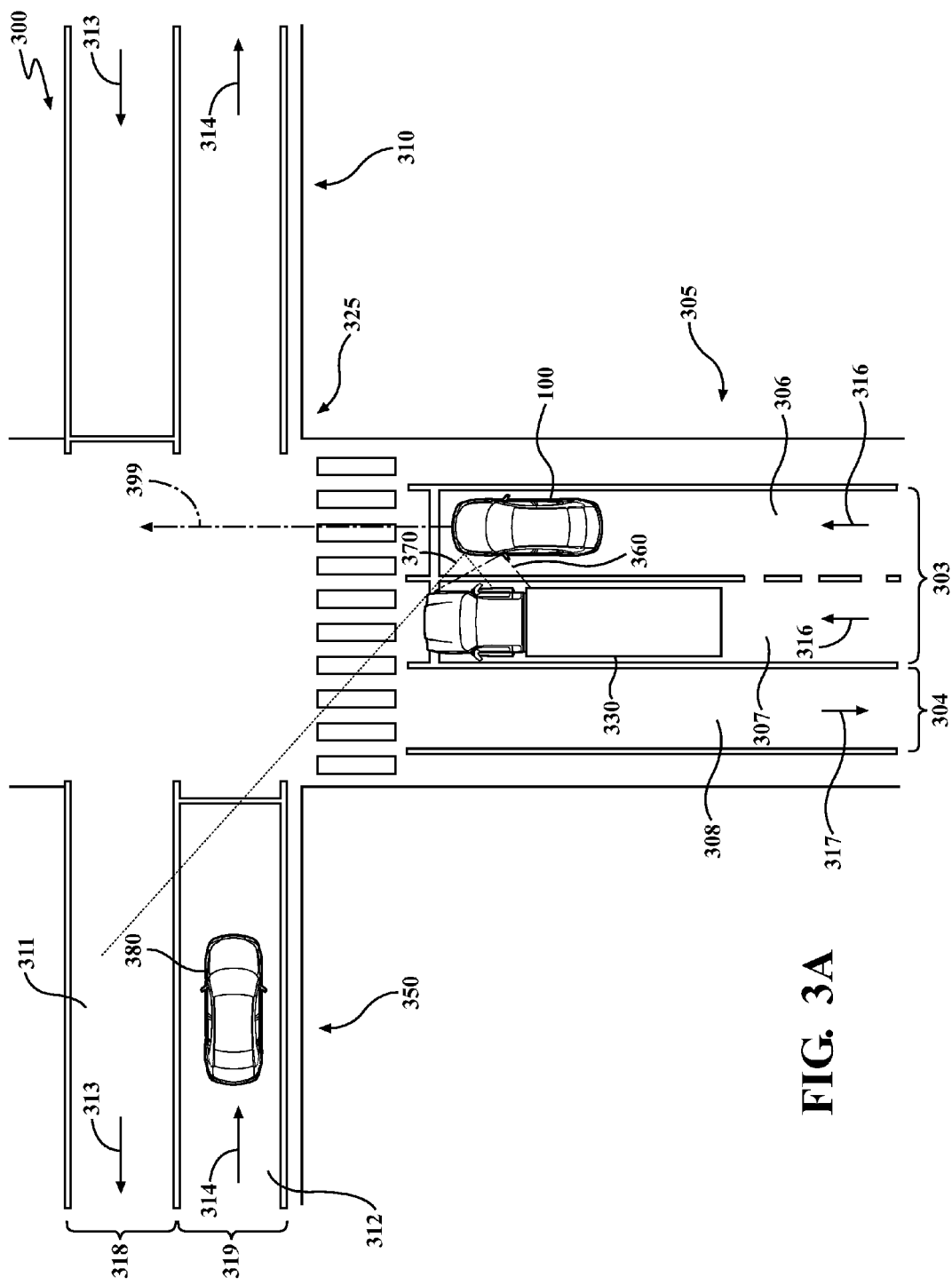
FIG. 3A is an example of an environment in which at least a portion of an information critical area to a future planned driving maneuver of a vehicle is located outside of a determined occupant viewable area and a determined sensor detection area due to the presence of a detected obstructing object.

One non-limiting example of the operation of the vehicle 100 in accordance with the method 200 will now be described in relation to FIGS. 3A and 3B. For purposes of this example, the vehicle 100 can be traveling in an environment 300 that includes a first road 305 and a second road 310. As used herein, "road" means a thoroughfare, route, path or way between two places and upon which a vehicle can travel. A road may be paved or otherwise improved to facilitate travel by a vehicle thereon. In some instances, a road may be unpaved or undeveloped. A road may be a public road or a private road. The road can include or be a part of one or more bridges, tunnels, supporting structures, junctions, crossings, interchanges, and toll roads.

The first road 305 and the second road 310 can cross each other to form an intersection 325. In one or more arrangements, traffic with respect to the intersection 325 can be regulated using any suitable traffic control device (e.g. stop signs, traffic lights, etc.). In one or more arrangements, the intersection 325 may not have an associated traffic control device. The first road 305 and the second road 310 can be oriented at any suitable angle with respect to each other. For instance, the first road 305 and the second road 310 can be oriented at substantially 90 degrees relative to each other, as is shown in FIGS. 3A and 3B. However, in one or more arrangements, the first road 305 and the second road 310 can be oriented at an acute angle with respect to each other. In one or more arrangements, the first road 305 and the second road 310 can be angled at an obtuse angle with respect to each other. Further, in some arrangements, the intersection 325 can be formed by more than two roads.

The first road 305 can include a plurality of travel lanes 306, 307, 308. As used herein, a "travel lane" is a portion of a road that is designated for use by a single line of vehicles and/or a portion of a road that is being used by a single line of vehicles. In some instances, the one or more travel lanes 306, 307, 308 can be designated by markings on the first road 305 or in any other suitable manner. In some instances, the one or more travel lanes 306, 307, 308 may not be marked.

The first road 305 and the second road 310 can have any suitable configuration and/or layout. The first road 305 and/or the second road 310 can be designated for two way travel, including a plurality of travel lanes. For purposes of this example, the first road 305 can include a first set of one or more travel lanes 303 and a second set of one or more travel lanes 304. The first set of travel lanes 303 can be intended or designated for vehicular travel in a first direction 316. The second set of travel lanes 304 can be intended or designated for vehicular travel in a second direction 317. The first direction 316 can be different from the second direction 317. For example, the first direction 316 can be substantially opposite to the second direction 317.

The first set of travel lanes 303 and the second set of travel lanes 304 can include any suitable type and/or quantity of travel lanes. For instance, FIGS. 3A and 3B show an example in which, at least which respect to the portion of the first road 305 below the intersection 325, the first set of travel lanes 303 can include two travel lanes 306, 307. The second set of travel lanes 304 can include a single travel lane 308.

The second road 310 can include a third set of one or more travel lanes 318 and a fourth set of one or more travel lanes 319. The third set of travel lanes 318 can be intended or designated for vehicular travel in a third direction 313. The fourth set of travel lanes 319 can be intended or designated for vehicular travel in a fourth direction 314. The third direction 313 can be different from the fourth direction 314. For example, the third direction 313 can be substantially opposite to the fourth direction 314.

The third set of travel lanes 318 and the fourth set of travel lanes 319 can include any suitable type and/or quantity of travel lanes. For instance, FIGS. 3A and 3B shows an example in which the third set of travel lanes 318 can include a travel lane 311, and the fourth set of travel lanes 319 can include a travel lane 312.

It will be understood that arrangements shown and described herein with respect to the first road 305, the second road 310 and/or the intersection 325 are provided merely as examples, and arrangements are not limited to the particular arrangements shown and described. Indeed, arrangements described herein can be used in connection with roads having any quantity, type and/or arrangement of travel lanes.

The vehicle 100 can be traveling on the first road 305. The current travel path of the vehicle 100 can include traveling forward on the first road 305 and passing through the intersection 325. The vehicle 100 can be approaching the intersection 325 while traveling in the first direction 316. As it approaches the intersection 325, the current travel lane of the vehicle 100 can be travel lane 306. "Current travel lane" means a travel lane that a vehicle is traveling on at the present time. Another vehicle (e.g. truck 330) can be located in travel lane 307. The vehicle 100 and the truck 330 can be stopped at the intersection 325. The vehicle 100 and the truck 330 can be presented with an indication to stop before proceeding into the intersection 325, such as by a traffic control device.

One or more information critical areas along at least a portion of the travel route can be identified by the vehicle 100 (e.g. the information critical area determination module 122, the navigation system 180 and/or the processor 110). The information critical area can be related to a future planned driving maneuver of the vehicle 100. In this example, the future planned driving maneuver can be driving forward through the intersection 325 in the first direction 316 on the first road 305. As a result, one information critical area can include an area 350 of the travel lane 312 located to the left (in FIGS. 3A and 3B) of the intersection 325, since any vehicles traveling in this area 350 would be of concern to the vehicle 100 as it proceeds through the intersection 325 on the first road 306.

The vehicle 100 can determine an occupant viewable area 360 of the external environment 300. However, the occupant viewable area 360 can be affected due to the presence of one or more obstructing objects (e.g. the truck 330). In such case, the occupant viewable area 360 may not be as large as it would otherwise be in the absence of the truck 330.

The vehicle 100 can determine a sensor detection area 370. The sensor detection area 370 can be affected due to the presence of one or more obstructing objects (e.g. the truck 330). In such case, the sensor detection area 370 may not be as large as it would otherwise be in the absence of the truck 330.

The vehicle 100 (the viewing analysis module 121, the information critical determination module 122 and/or the processor 110) can determine whether at least a portion of the information critical area 350 is located outside of the determined occupant viewable area 360 and the sensor detection area 370. As shown in the example of FIG. 3A, the information critical area 350 is located outside of the determined occupant viewable area 360 and the sensor detection area 370 due to the presence of the truck 330. Thus, neither the sensor system 125 nor the vehicle occupant(s) (e.g. the driver) can sense the information critical area 350. As a result, there would be an elevated risk to performing the future planned driving maneuver (e.g. moving forward on the first road 305 in the first direction 316) because insufficient information is available about the information critical area 330. In this example, another vehicle 380 can be present in the information critical area 350.

Responsive to determining that at least a portion of the information critical area is located outside of the determined occupant viewable area 360 and the determined sensor detection area 370, it can be determined whether the truck 330 is moving favorably relative to the future planned driving maneuver of the vehicle 100. The vehicle 100 can monitor the truck 330 to assess its movement. In one or more arrangements, the vehicle 100 can remain at a stop until it determines whether the vehicle 100 is moving favorably relative to the future planned driving maneuver of the vehicle 100. The movement of the truck 330 can be detected by the sensor system 125, the camera system 127 and/or the processor 100. The determination of whether the truck 330 is moving favorably or unfavorably relative to the future planned driving maneuver of the vehicle 100 can be performed by any suitable element or combination of elements of the vehicle 100. For instance, in one or more arrangements, the determining can be performed by the processor 110, the sensor system 125, the camera system 127 (e.g. one or more occupant view cameras), the autonomous driving module 120 and/or the object movement classification module 124.

Figure 3B:
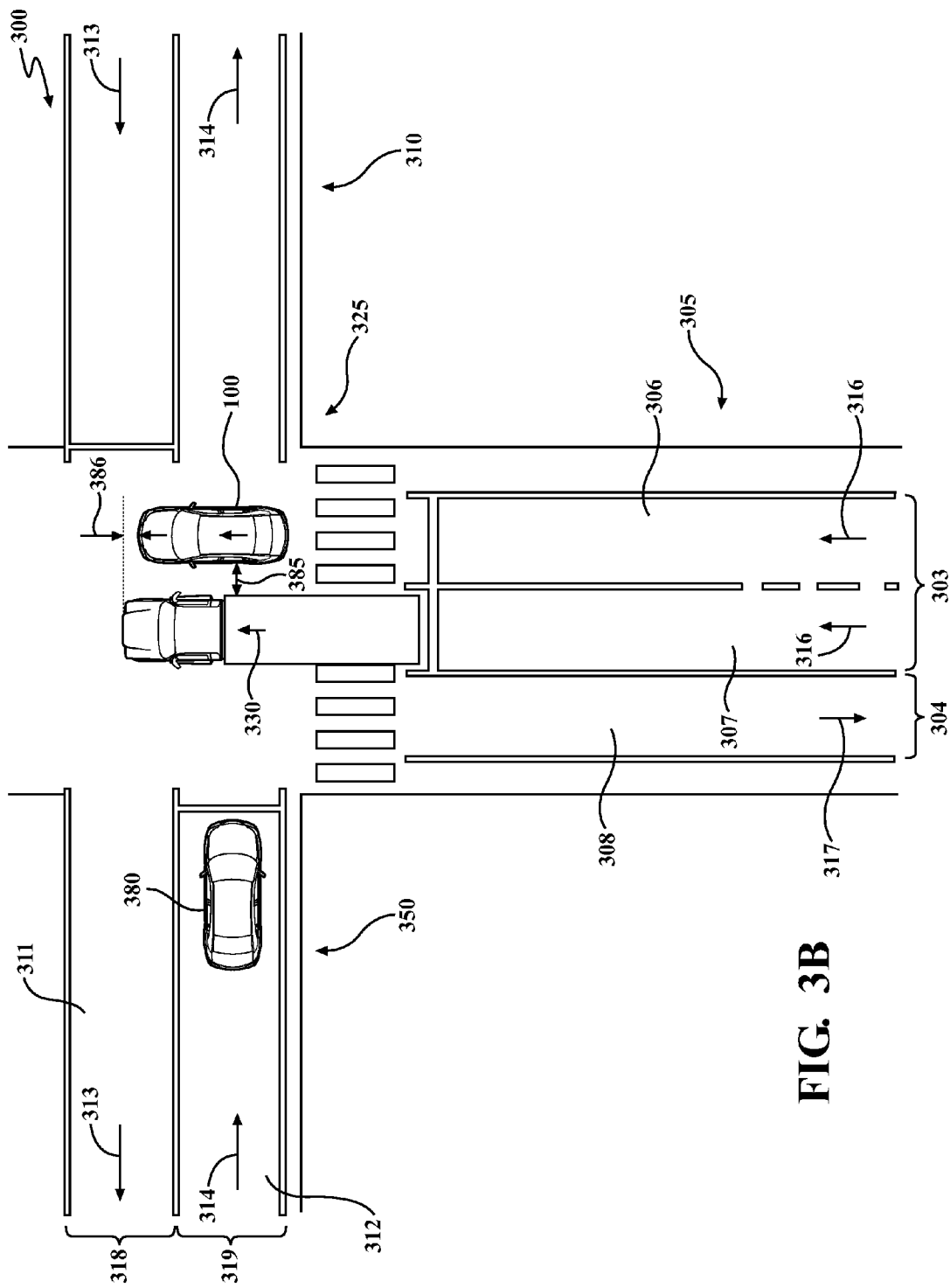
FIG. 3B is an example of the environment of FIG. 3A, showing the detected obstructing object moving favorably relative to a future planned driving maneuver of the vehicle.

In this example, the truck 330 can move forward along the first road 305 in the first direction 316, as is shown in FIG. 3B. Thus, the truck 330 is moving favorably relative to the future planned driving maneuver of the vehicle 100 (driving through the intersection 325 in the first direction 316 on the first road 305) because the truck 330 is moving in a direction and/or in such a way that it will be located between the information critical area 350 and the vehicle 100 while the vehicle 100 is driving through the intersection 325 in the first direction 316 on the first road 305. Such an arrangement is shown in FIG. 3B.

Responsive to determining that the truck 330 is moving favorably relative to the future planned driving maneuver of the vehicle 100, the vehicle 100 can be caused to implement the future planned driving maneuver while moving relative to the truck 330. In one or more arrangements, the processor 110 and/or the driving module 120 can cause the vehicle 100 to implement the future planned driving maneuver. The processor 110 and/or the driving module 120 can be operatively connected to one or more of the vehicle systems 145 to implement the future planned driving maneuver. In one or more arrangements, the processor 110 and/or the driving module 120 can be operable to control the one or more actuators 140, which can control one or more of the vehicle systems 145 or portions thereof to implement the future planned driving maneuver.

As noted above, the vehicle 100 moves relative to the truck 330. Any suitable relative movement can be implemented. For instance, in one or more arrangements, the vehicle 100 can move at substantially the same speed as the truck 330. In one or more arrangements, the vehicle 100 can move alongside the truck 330 while maintaining a predetermined minimum lateral spacing 385. In one or more arrangements, the vehicle 100 can move forward without moving ahead of the truck 330. In one or more arrangements, a predetermined leading distance 386 between the vehicle 100 and the truck 330 can be maintained.

In view of the above, it will be appreciated that the truck 330 can shield the vehicle 100 from any potential objects (e.g. the vehicle 380) located in the at least a portion of the information critical area 350 that is located outside of the determined occupant viewable area 360 and the determined sensor detection area 370 due to the truck 330. By operating in such a manner, the risk of being impinged upon by an object (e.g. the vehicle 380) in the information critical area 350 may be reduced because it is more likely that such an object would impinge upon the truck 330 first.

The vehicle 100 can continue to move relative to the vehicle to any suitable point. For instance, the vehicle 100 can continue to move relative to the truck 330 at least until the vehicle 100 passes the information critical area 350. Alternatively or in addition, the vehicle 10 can continue to move relative to the truck 330 at least until the vehicle 100 completes the future planned driving maneuver.

Figure 4A:
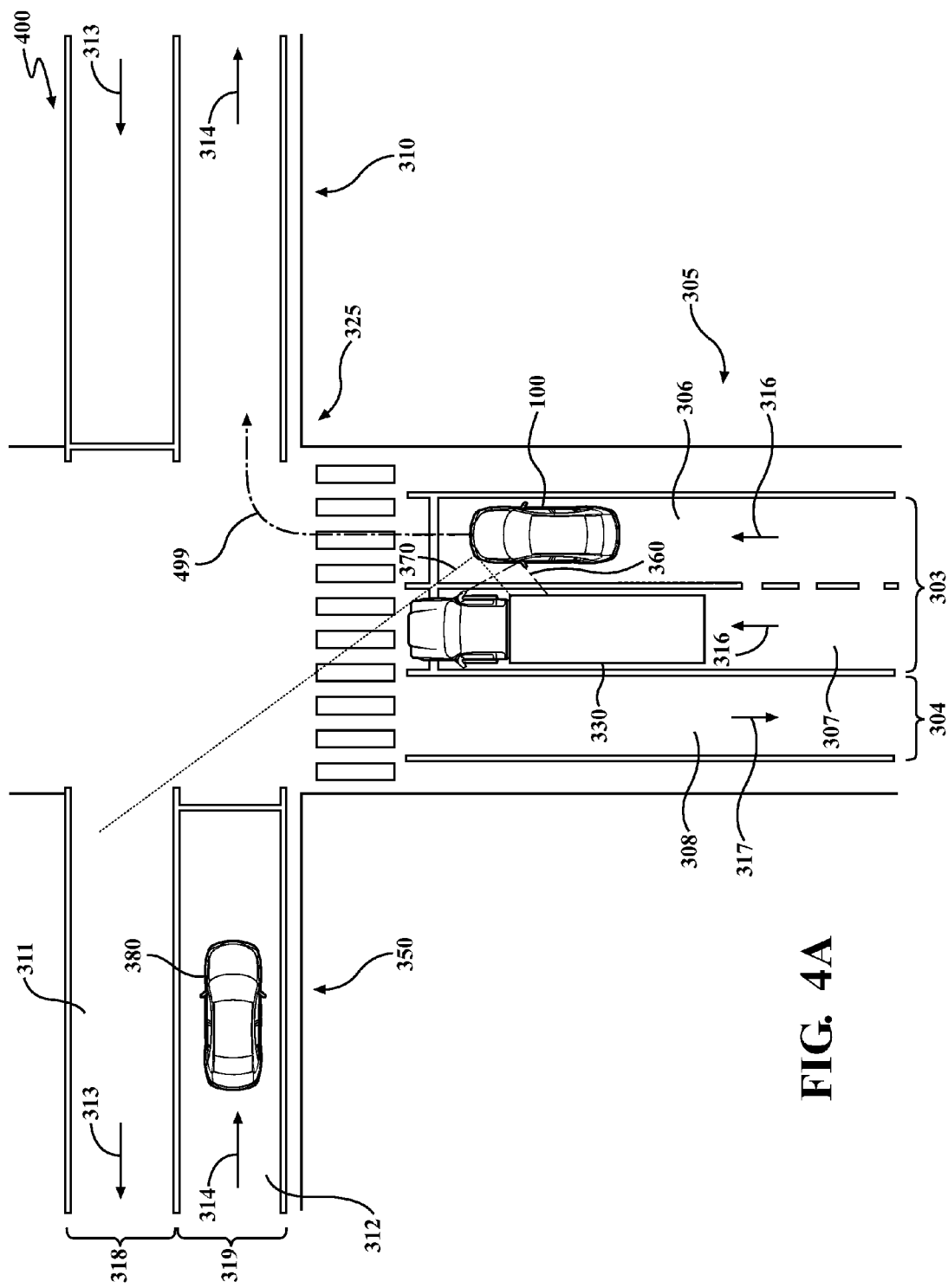
FIG. 4A is an example of an environment in which at least a portion of an information critical area to a future planned driving maneuver of a vehicle is located outside of a determined occupant viewable area and a determined sensor detection area due to the presence of a detected obstructing object.
Figure 4B:
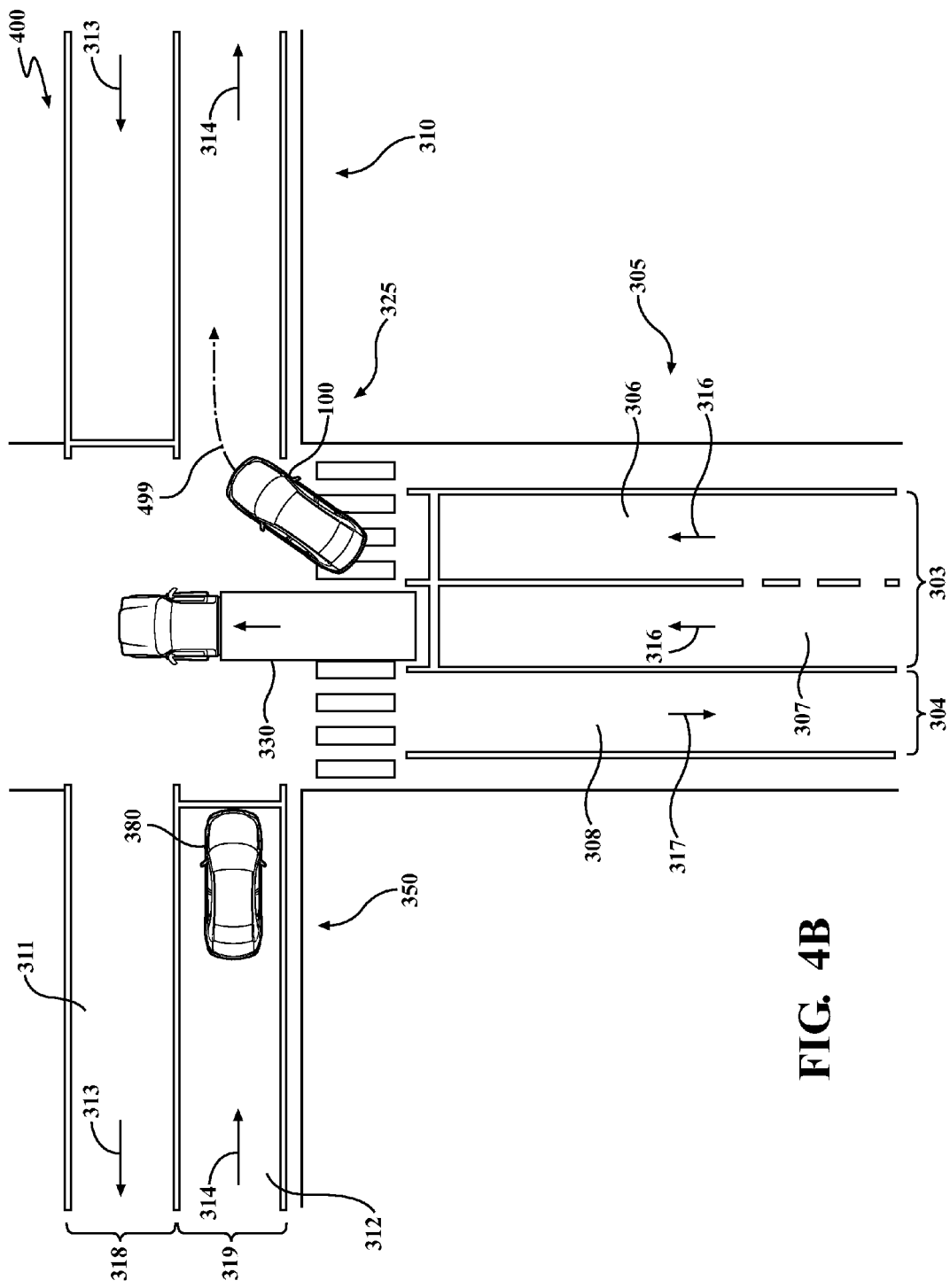
FIG. 4B is an example of the environment of FIG. 4A, showing the detected obstructing object moving favorably relative to a future planned driving maneuver of the vehicle.

Another non-limiting example of the operation of the vehicle 100 in accordance with the method 200 will now be described in relation to FIGS. 4A and 4B. For purposes of this example, the vehicle 100 can be traveling in an environment 400. For simplicity, the environment 400 can be substantially identical to the environment 300 at least with respect to the first and second roads 305, 310. Accordingly, the above description of the environment 300 applies equally to the environment 400 and is incorporated herein.

The vehicle 100 and the truck 330 can be stopped at the intersection 325. For purposes of the example shown in FIG. 4A, the future planned driving maneuver can be a right turn onto the second street 310. While the following discussion of FIGS. 4A and 4B concern a right hand turn 499, it will be understood that arrangements are not limited to right turns. Indeed, arrangements described herein can be used in connection with left turns or even roundabouts.

One or more information critical areas along at least a portion of the travel route can be identified by the vehicle 100 (e.g. the information critical area determination module 122, the navigation system 180 and/or the processor 110). Since the future planned driving maneuver of the vehicle 100 is a right turn onto the second street 310, one information critical area can include an area 350 of the travel lane 312 located to the left (in FIGS. 4A and 4B) of the intersection 325, since any vehicles traveling in this area 350 would be of concern to the vehicle 100 as it turns right onto the second road 310.

The vehicle 100 can determine an occupant viewable area 360 and the sensor detection area 370, both of which are affected due to the presence of the truck 330. The vehicle 100 can determine whether at least a portion of the information critical area 350 is located outside of the determined occupant viewable area 360 and the sensor detection area 370, as is shown in FIG. 4A. Thus, neither the sensor system 125 nor the vehicle occupant(s) (e.g. the driver) can sense the information critical area 350. As a result, there would be an elevated risk to performing the future planned driving maneuver (e.g. moving forward on the first road 305 in the first direction 316) because insufficient information is available about the information critical area 330. In this example, another vehicle 380 can be present in the information critical area 350.

Responsive to determining that at least a portion of the information critical area is located outside of the determined occupant viewable area 360 and the determined sensor detection area 370, it can be determined whether the truck 330 is moving favorably relative to the future planned driving maneuver of the vehicle 100. In this example, the truck 330 can move forward along the first road 305 in the first direction 316, as is shown in FIG. 4B. Thus, the truck 330 is moving favorably relative to the future planned driving maneuver of the vehicle 100 (turning right onto the second road 310) because the truck 330 is moving in a direction and/or in such a way that it will be located between the information critical area 350 and the vehicle 100 while the vehicle 100 is driving through the intersection 325 in the first direction 316 on the first road 305. Such an arrangement is shown in FIG. 4B.

Responsive to determining that the truck 330 is moving favorably relative to the future planned driving maneuver of the vehicle 100, the vehicle 100 can be caused to implement the future planned driving maneuver while moving relative to the truck 330. Any suitable relative movement can be implemented. For instance, in one or more arrangements, the vehicle 100 can move at one or more speeds to complete the right hand turn 499 while keeping the truck 330 between the vehicle 100 and the information critical area 350.

In view of the above, it will be appreciated that the truck 330 can shield the vehicle 100 from any potential objects (e.g. the vehicle 380) located in the at least a portion of the information critical area 350 that is located outside of the determined occupant viewable area 360 and the determined sensor detection area 370 due to the truck 330. By operating in such a manner, the risk of being impinged upon by an object (e.g. the vehicle 380) in the information critical area 350 may be reduced because it is more likely that such an object would impinge upon the truck 330 first.

It will be appreciated that arrangements described herein can provide numerous benefits, including one or more of the benefits mentioned herein. For example, arrangements described herein can improve the performance of an autonomous vehicle when operating in view-obstructed environments. Arrangements described herein can provide a degree of comfort and confidence to vehicle occupants by using a physical barrier or a movable shield in the environment to implement a future planned driving maneuver. Further, arrangements described herein can potentially improve the safe operation of the vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle in occupant view and vehicle sensor obstructed environments, comprising:
    identifying an information critical area in an external environment relative to a future planned driving maneuver of the autonomous vehicle;
    sensing at least a portion of the external environment of the autonomous vehicle to detect the presence of an obstructing object located therein;
    responsive to determining that at least a portion of the information critical area is located outside of a determined occupant viewable area and a determined sensor detection area due to the presence of the detected obstructing object, determining whether the detected obstructing object is moving favorably relative to a future planned driving maneuver of the autonomous vehicle; and responsive to determining that the detected obstructing object is moving favorably relative to the future planned driving maneuver of the autonomous vehicle, causing the autonomous vehicle to implement the future planned driving maneuver while moving relative to the detected obstructing object so that the detected obstructing object is located between the autonomous vehicle and any potential objects located in the at least a portion of the information critical area that is located outside of the determined occupant viewable area and the determined sensor detection area due to the detected obstructing object.

2. The method of claim 1, further including determining the speed of the detected obstructing object, and wherein causing the autonomous vehicle to implement the future planned driving maneuver while moving relative to the detected obstructing object includes causing the autonomous vehicle to implement the future planned driving maneuver while moving forward at substantially the same speed as the detected obstructing object.

3. The method of claim 1, further including detecting the movement of the detected obstructing object, and wherein causing the autonomous vehicle to implement the future planned driving maneuver while moving relative to the detected obstructing object includes causing the autonomous vehicle to implement the future planned driving maneuver while moving alongside the detected obstructing object without moving ahead of the detected obstructing object.

4. The method of claim 1, wherein causing the autonomous vehicle to implement the future planned driving maneuver while moving relative to the detected obstructing object is performed until at least one of:
the autonomous vehicle passes the information critical area; and
the autonomous vehicle completes the future planned driving maneuver.

5. The method of claim 1, further including:
detecting a dimension of the detected obstructing object;
determining whether the detected obstructing object is a large object based on the detected dimension of the detected obstructing object; and
wherein causing the autonomous vehicle to implement the future planned driving maneuver while moving relative to the detected obstructing object is further responsive to determining that the detected obstructing object is an large object.

6. The method of claim 1, wherein the future planned driving maneuver includes traveling in substantially the same direction as the detected obstructing object.

7. The method of claim 1, wherein the future planned driving maneuver includes one of a right turn or a left turn.

8. A system for operating an autonomous vehicle in occupant view and vehicle sensor obstructed environments, the system comprising:
a sensor system, the sensor system being configured to:
sense at least a portion of the external environment of the autonomous vehicle to detect the presence of an obstructing object located therein; and
a processor operatively connected to the sensor system, the processor being programmed to initiate executable operations comprising:
identifying an information critical area in an external environment relative to a future planned driving maneuver of the autonomous vehicle;
determining an occupant viewable area of the external environment;
determining a sensor detection area of the external environment;
responsive to determining that at least a portion of the information critical area is located outside of the determined occupant viewable area and the determined sensor detection area due to the presence of the detected obstructing object, determining whether the detected obstructing object is moving favorably relative to a future planned driving maneuver of the autonomous vehicle; and
responsive to determining that the detected obstructing object is moving favorably relative to a future planned driving maneuver of the autonomous vehicle, causing the autonomous vehicle to implement the future planned driving maneuver while moving relative to the detected obstructing object so that the detected obstructing object is located between the autonomous vehicle and any potential objects located in the at least a portion of the information critical area that is located outside of the determined occupant viewable area and the determined sensor detection area due to the detected obstructing object.

9. The system of claim 8, wherein at least one of the sensor system or the processor is configured to determine the speed of the detected obstructing object, and wherein causing the autonomous vehicle to implement the future planned driving maneuver while moving relative to the detected obstructing object includes causing the autonomous vehicle to implement the future planned driving maneuver while moving forward at substantially the same speed as the detected obstructing object.

10. The system of claim 8, wherein at least one of the sensor system or the processor is configured to detect the movement of the detected obstructing object, and wherein causing the autonomous vehicle to implement the future planned driving maneuver while moving relative to the detected obstructing object includes causing the autonomous vehicle to implement the future planned driving maneuver while moving alongside the detected obstructing object without moving ahead of the detected obstructing object.

11. The system of claim 8, wherein causing the autonomous vehicle to implement the future planned driving maneuver while moving relative to the detected obstructing object is performed until at least one of:
the autonomous vehicle passes the information critical area; and
the autonomous vehicle completes the future planned driving maneuver.

12. The system of claim 8, wherein the executable operations further include:
detecting a dimension of the detected obstructing object;
determining whether the detected obstructing object is a large object based on the detected dimension of the detected obstructing object; and
wherein causing the autonomous vehicle to implement the future planned driving maneuver while moving relative to the detected obstructing object is further responsive to determining that the detected obstructing object is a large object.

13. The system of claim 8, wherein the future planned driving maneuver includes traveling in substantially the same direction as the detected obstructing object.

14. The system of claim 8, wherein the future planned driving maneuver includes one of a right turn or a left turn.

15. A computer program product for operating an autonomous vehicle in occupant view and vehicle sensor obstructed environments, the computer program product comprising a non-transitory computer readable storage medium having program code embodied therein, the program code executable by a processor to perform a method comprising:

identifying an information critical area in an external environment relative to a future planned driving maneuver of the autonomous vehicle;

sensing at least a portion of the external environment of the autonomous vehicle to detect the presence of an obstructing object located therein;

determining an occupant viewable area of the external environment;

determining a sensor detection area of the external environment;

responsive to determining that at least a portion of the information critical area is located outside of the determined occupant viewable area and the determined sensor detection area due to the presence of the detected obstructing object, determining whether the detected obstructing object is moving favorably relative to a future planned driving maneuver of the autonomous vehicle; and responsive to determining that the detected obstructing object is moving favorably relative to a future planned driving maneuver of the autonomous vehicle, causing the autonomous vehicle to implement the future planned driving maneuver while moving relative to the detected obstructing object so that the detected obstructing object is located between the autonomous vehicle and any potential objects located in the at least a portion of the information critical area that is located outside of the determined occupant viewable area and the determined sensor detection area due to the detected obstructing object.

16. The computer program product of claim 15, further including determining the speed of the detected obstructing object, and wherein causing the autonomous vehicle to implement the future planned driving maneuver while moving relative to the detected obstructing object includes causing the autonomous vehicle to implement the future planned driving maneuver while moving forward at substantially the same speed as the detected obstructing object.

17. The computer program product of claim 15, further including detecting the movement of the detected obstructing object, and wherein causing the autonomous vehicle to implement the future planned driving maneuver while moving relative to the detected obstructing object includes causing the autonomous vehicle to implement the future planned driving maneuver while moving alongside the detected obstructing object without moving ahead of the detected obstructing object.

18. The computer program product of claim 15, wherein causing the autonomous vehicle to implement the future planned driving maneuver while moving relative to the detected obstructing object is performed until at least one of:

the autonomous vehicle passes the information critical area; and the autonomous vehicle completes the future planned driving maneuver.

19. The computer program product of claim 15, wherein the method further includes:

detecting a dimension of the detected obstructing object;

determining whether the detected obstructing object is a large object based on the detected dimension of the detected obstructing object; and wherein causing the autonomous vehicle to implement the future planned driving maneuver while moving relative to the detected obstructing object is further responsive to determining that the detected obstructing object is a large object.

20. The computer program product of claim 15, wherein the future planned driving maneuver includes traveling in substantially the same direction as the detected obstructing object.

\* \* \* \* \*

UNITED STATES PATENT AND TRADEMARK OFFICE
CERTIFICATE OF CORRECTION

PATENT NO.        : 9,493,157 B2
APPLICATION NO.   : 14/609286
DATED             : November 15, 2016
INVENTOR(S)       : Prokhorov Page 1 of 1

It is certified that error appears in the above-identified patent and that said Letters Patent is hereby corrected as shown below:

In the Specification

In Column 10, Line 37, delete "its view cameras 129 can be fixed such that".
In Column 13, Line 11, delete "system 126" and insert --system 127--.
In Column 13, Line 13, delete "camera system 126" and insert --camera system 127--.
In Column 13, Line 16, delete "camera system 126" and insert --camera system 127--.
In Column 13, Line 58, delete "160" and insert --130--.
In Column 16, Line 66, delete "the driving module 120" and insert --the autonomous driving module 120--.
In Column 19, Line 5, delete "driving module 120" and insert --autonomous driving module 120--.
In Column 19, Line 7, delete "the driving module 120" and insert --the autonomous driving module 120--.
In Column 19, Line 10, delete "the driving" and insert --the autonomous driving--.
In Column 22, Line 17, delete "350".
In Column 22, Line 19, delete "350".
In Column 22, Line 21, delete "306" and insert --305--.
In Column 22, Line 35, delete "information critical determination module" and insert --information critical area determination module--.
In Column 22, Line 49, delete "330" and insert --350--.
In Column 22, Line 63, delete "processor 100" and insert --processor 110--.
In Column 23, Line 23, delete "the driving module 120" and insert --the autonomous driving module 120--.
In Column 23, Line 25, delete "the driving module 120" and insert --the autonomous driving module 120--.
In Column 23, Line 28, delete "the driving" and insert --the autonomous driving--.
In Column 24, Line 6, delete "the second street 310" and insert --the second road 310--.
In Column 24, Line 16, delete "the second street 310" and insert --the second road 310--.
In Column 24, Line 34, delete "330" and insert --350--.

Signed and Sealed this
Tenth Day of April, 2018

Andrei Iancu
*Director of the United States Patent and Trademark Office*